May 12, 1964  P. E. CAVANAGH ETAL  3,133,015
APPARATUS FOR SEPARATING MAGNETIC SUSCEPTIBLE PARTICLES
Original Filed Aug. 16, 1957                           12 Sheets-Sheet 9

INVENTORS
CARL W. HEDBERG
PATRICK E. CAVANAGH

BY Harold T. Stowell
   Harold L. Stowell
                    ATTORNEYS

May 12, 1964 P. E. CAVANAGH ETAL 3,133,015
APPARATUS FOR SEPARATING MAGNETIC SUSCEPTIBLE PARTICLES
Original Filed Aug. 16, 1957 12 Sheets-Sheet 10

INVENTORS
CARL W. HEDBERG
PATRICK E. CAVANAGH
BY Harold T. Stowell
Harold L. Stowell
ATTORNEYS May 12, 1964 P. E. CAVANAGH ETAL 3,133,015
APPARATUS FOR SEPARATING MAGNETIC SUSCEPTIBLE PARTICLES
Original Filed Aug. 16, 1957 12 Sheets-Sheet 12

INVENTORS
CARL W. HEDBERG
BY PATRICK E. CAVANAGH
Harold T. Stowell
Harold L. Stowell
ATTORNEYS

United States Patent Office 3,133,015
Patented May 12, 1964

3,133,015
APPARATUS FOR SEPARATING MAGNETIC SUSCEPTIBLE PARTICLES
Patrick E. Cavanagh, Oakville, Ontario, Canada, and Carl W. Hedberg, Bound Brook, N.J., assignors to Research-Cottrell, Inc., Bridgewater Township, N.J., a corporation of New Jersey
Original application Aug. 16, 1957, Ser. No. 678,468, now Patent No. 2,990,124, dated June 27, 1961. Divided and this application Feb. 13, 1961, Ser. No. 94,107
6 Claims. (Cl. 209—39)

This invention relates to a new and improved apparatus for separating and concentrating magnetic susceptible materials.

It is a particular object of the present invention to provide apparatus for a system for concentrating magnetite bearing low grade ores to provide a premium ore containing 60% or better iron content.

It is a particular object of the present invention to provide apparatus for carrying the system into operation which is principally adapted for concentrating low grade iron-containing minerals having relatively high magnetic attractabilities such as magnetite ($Fe_3O_4$), Franklinite $(FeMnZn)O.(FeMn)_2O_3$, ilmenite ($FeT_2O_3$) and the like. These minerals have appreciably higher magnetic attractabilities than, for example, the feebler magnetic susceptible iron-containing minerals such as hematite ($Fe_2O_3$).

These and other objects and advantages of the present invention are provided by a magnetic separator for air suspended particles including a first cylindrical drum, means axially mounting the drum for rotation in a generally horizontal plane, means for rotating the drum about the axial mounting, a second cylindrical drum having a diameter less than the diameter of the first drum, a plurality of permanent magnets secured to the outer surface of the second cylindrical drum in a spiral array including left- and right-hand spirals to form a generally herring-bone configuration, means for mounting the second cylindrical drum for rotation within the first cylindrical drum, means for rotating the second cylindrical drum to provide a differential speed between the first and second drums, means for directing air suspended particulate material including magnetic susceptible particles to the outer surface of the first cylindrical drum, means for collecting magnetic susceptible particles adjacent the edges of the first cylindrical drum where the attractive force of the magnetic field is reduced, and means adjacent the collecting zone for directing a stream of pressure fluid in a direction opposite the direction of travel of the magnetic susceptible particles.

These and other objects and advantages of the present invention will become more apparent to those skilled in the art from the following detailed description of the present invention which will be more completely described with reference to the accompanying drawings wherein.

Figure 4:
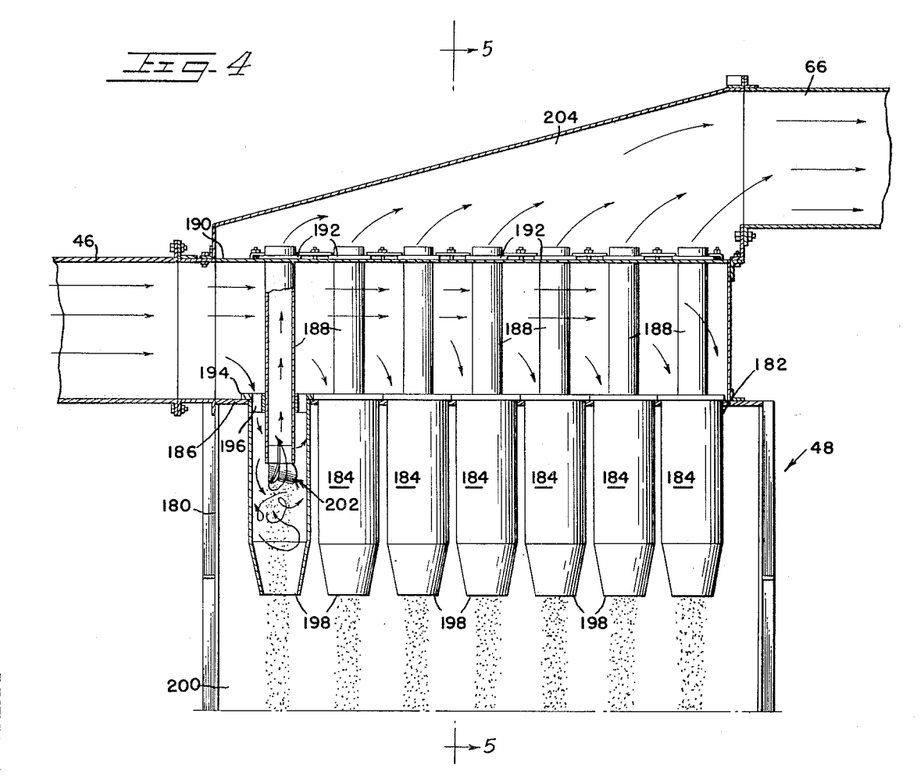
FIG. 4 is a vertical, sectional view through the fine fraction feed mechanism for the separator shown in FIG. 1.
Figure 5:
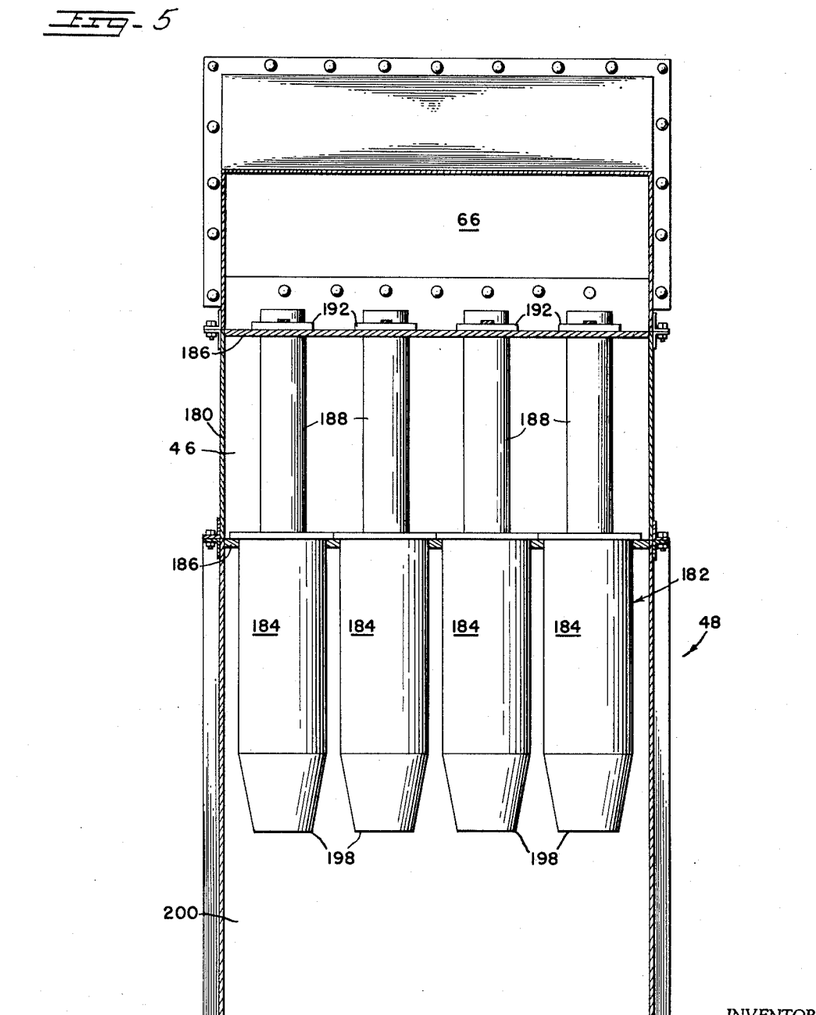
FIG. 5 is a section substantially on line 5—5 of FIG. 4.

Referring particularly to FIGS. 4 and 5 an air stream carrying a suspended fine fraction of ground ore in conduit 46 enters housing 180 within which is maintained a plurality of cyclone separators generally designated 182. In the form of the apparatus shown in the drawings about 32 separators are employed in each of the separation units 48. The cyclone separators comprise a plurality of separator tubes 184 which are supported in a horizontal header sheet 186 extending across the housing 180. Within each of the separator tubes 184 is maintained an outlet tube 188 of lesser diameter than the separator tube 184. The lower end of each outlet tube 188 projects into the interior portion of its complementary separator tube while the upper end projects through an upper header sheet 190 where anchoring means 192 are provided. At the inlet to the separator tubes 184 are provided spinner rings 194 which include a plurality of spinning vanes 196. The vanes 196 extend between the outer surface of the outlet tube 188 and the inner surface of the separator tube 184 whereby the gas stream carrying the suspended particles to be separated into the space between the lower header sheet 186 and the upper header sheet 190 is caused to swirl upon entering into the interior portion of the separator tubes 184.

The gas stream containing the suspended particles induced to swirl by the vanes 196 continues in a swirling path downwardly into the separator tubes 184. Centrifugal force developed by the swirling gas stream causes the suspended particles to concentrate in the portion of the gas stream adjacent the inner surface of each of the separator tubes 184. A portion of the gas stream entering each of the tubes and the major part of the suspended particles leaves the separator tubes adjacent the lower outlet 198 into a collection chamber generally designated 200. The remainder of the gas stream passes upwardly through the outlet tubes 188 of each of the centrifugal separators and in passing from each separator tube into the outlet tubes the gases flow about helical straightening vanes 202 which convert the energy of rotation of the gases to kinetic energy and reduce the pressure loss which would otherwise take place in the mechanical cyclone separators 182. The gas stream leaving the outlet tubes 188 collects in upper plenum chamber 204 and then issues from the separator units 48 through suitable discharge conduits as disclosed in our Patent 2,990,124.

In general it has been found that removal of 90% of the suspending air permitting only 10% of the air to pass with the fine fraction to the separators 34' has been found to give very satisfactory results. For example, where 30 cubic feet of air is required to suspend each pound of fine fraction of ground material, the volume of air is decreased to three cubic feet per pound of dust prior to the passage of the fine fraction through the helical magnetic separators, and satisfactory results are obtainable when from about 80 to about 95% of the suspending air stream is removed at this point.

Figure 12:
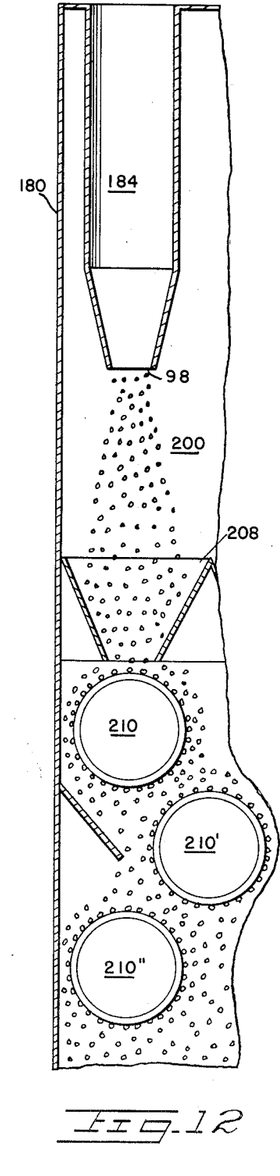
FIG. 12 is a diagrammatic sectional view showing the flow path of material through a portion of the separator shown in FIG. 1.
Figure 13:
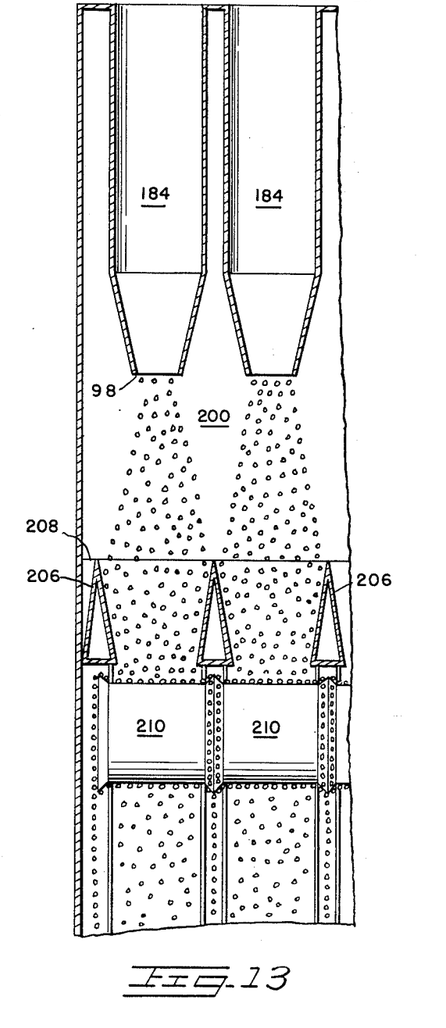
FIG. 13 is a view similar to that shown in FIG. 12 taken at right angles thereto.
Figure 14:
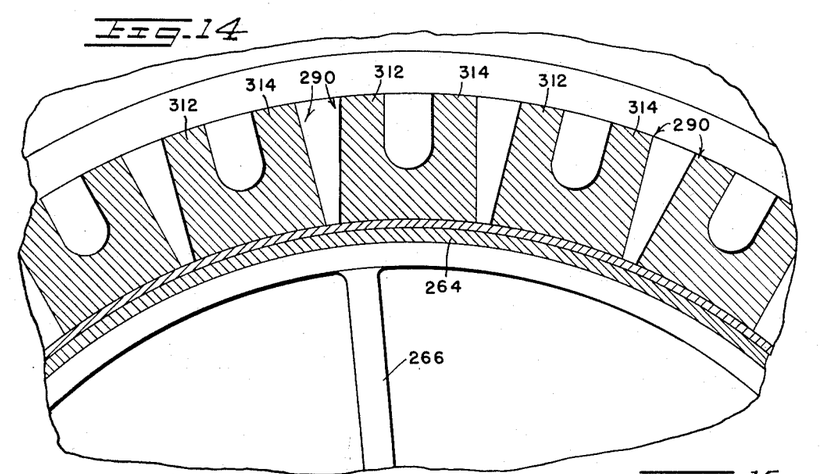
FIG. 14 is an enlarged fragmentary sectional view of the permanent magnets for the magnetic separator units of the device shown in FIG. 1.
Figure 15:
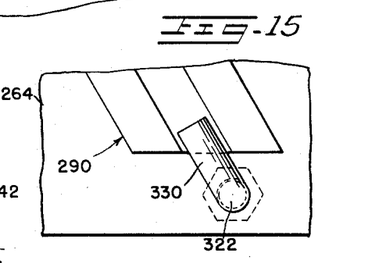
FIG. 15 is a fragmentary view of the means for attaching the magnets to the unit shown in FIG. 14.
Figure 16:
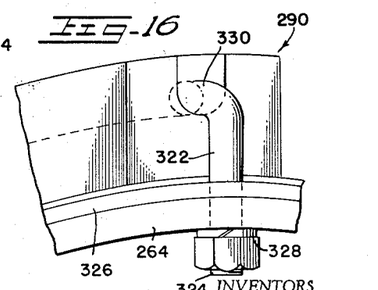
FIG. 16 is a fragmentary view of the attaching system shown in FIG. 15.
Figure 17:
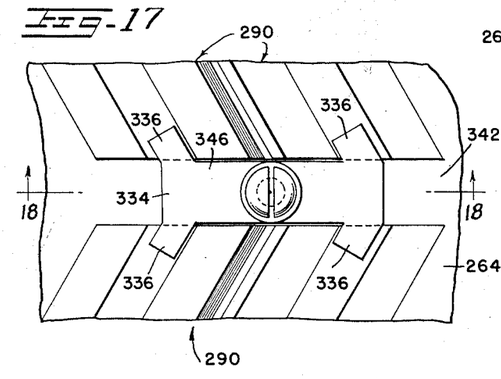
FIG. 17 is a top plan view of attaching means for connecting the inner ends of the permanent magnets on a separator of the type shown in FIG. 1.
Figure 18:
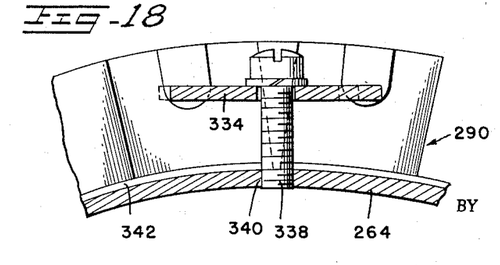
FIG. 18 is a section substantially on line 18—18 of FIG. 17.
Figure 19:
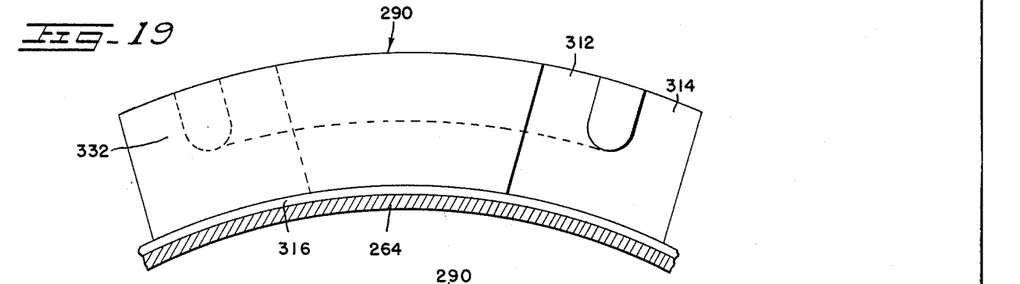
FIG. 19 is an enlarged view of one of the magnet units of the separator shown in FIG. 1.
Figure 20:
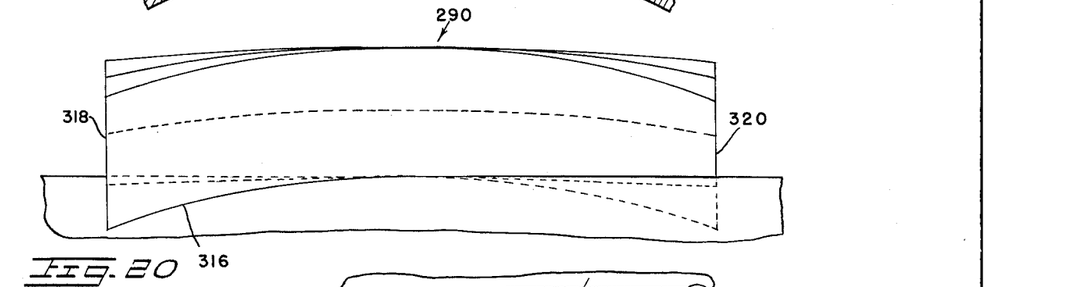
FIG. 20 is another view of the permanent magnet shown in FIG. 19.
Figure 21:
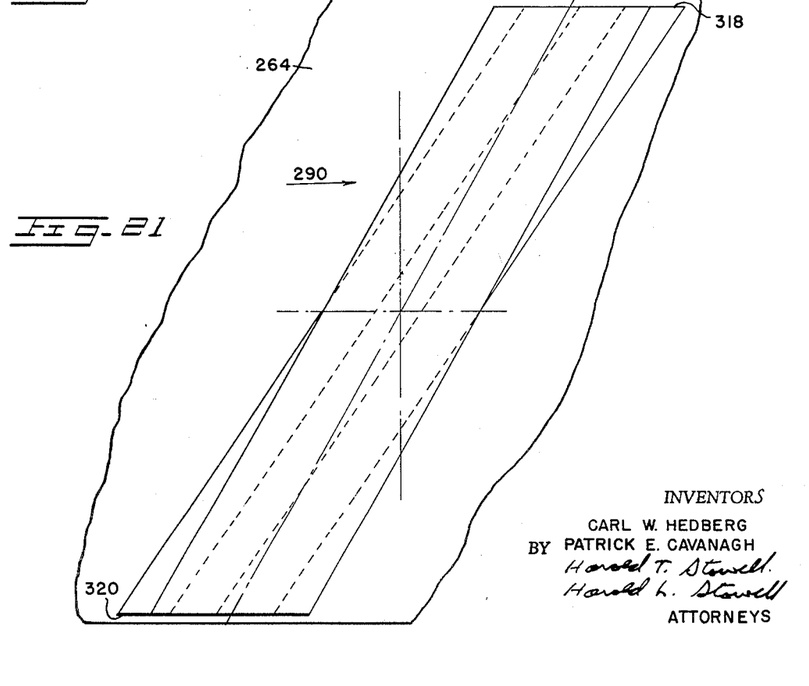
FIG. 21 is a top plan view of the magnet shown in FIGS. 19 and 20.

The primary portion of the fine fraction of ground material along with a predetermined portion of the suspending air stream issuing into the plenum chamber 200 move downwardly about grids or baffles 206 and 208. As shown in FIGS. 12 and 13 the grids or baffles 206 and 208 aid in the equal distribution of the gas stream and its suspended particles into the plural magnetic separators 210 in the uppermost horizontal row of the magnetic treating units 48. From separators 210 the material moves to further magnetic separator units designated 210' and 210" which as to be more fully described are identical in form to separator units 210.

Figure 2:
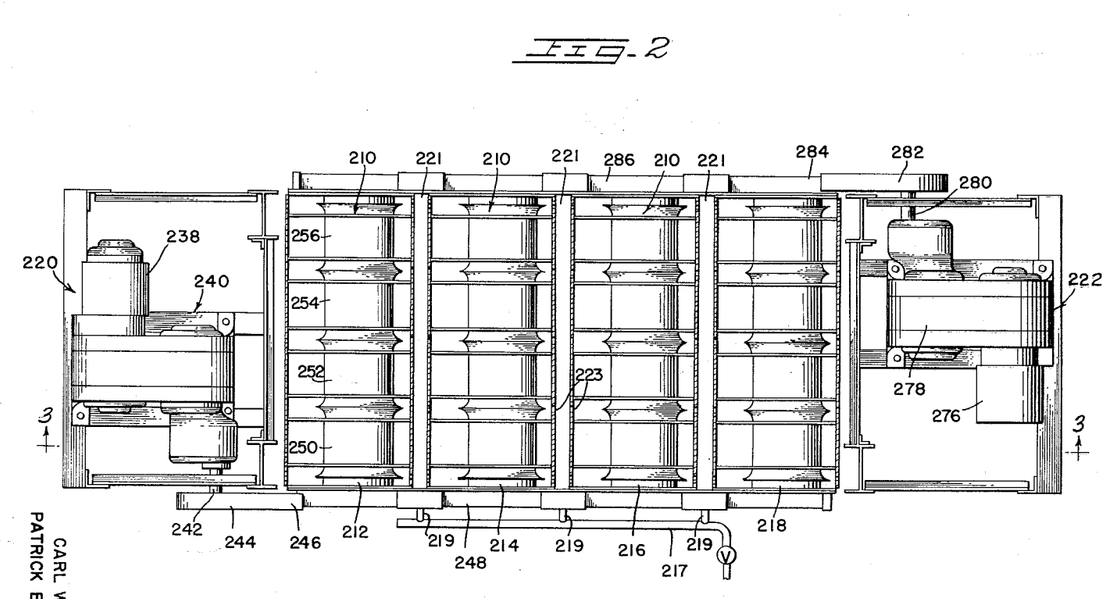
FIG. 2 is a top plan view of the magnetic separator shown in FIG. 1.

Each parallel layer 210, 210', and 210" of separators includes 4 parallel rows as more clearly shown in FIG. 2 and designated 212, 214, 216 and 218.

Figure 1:
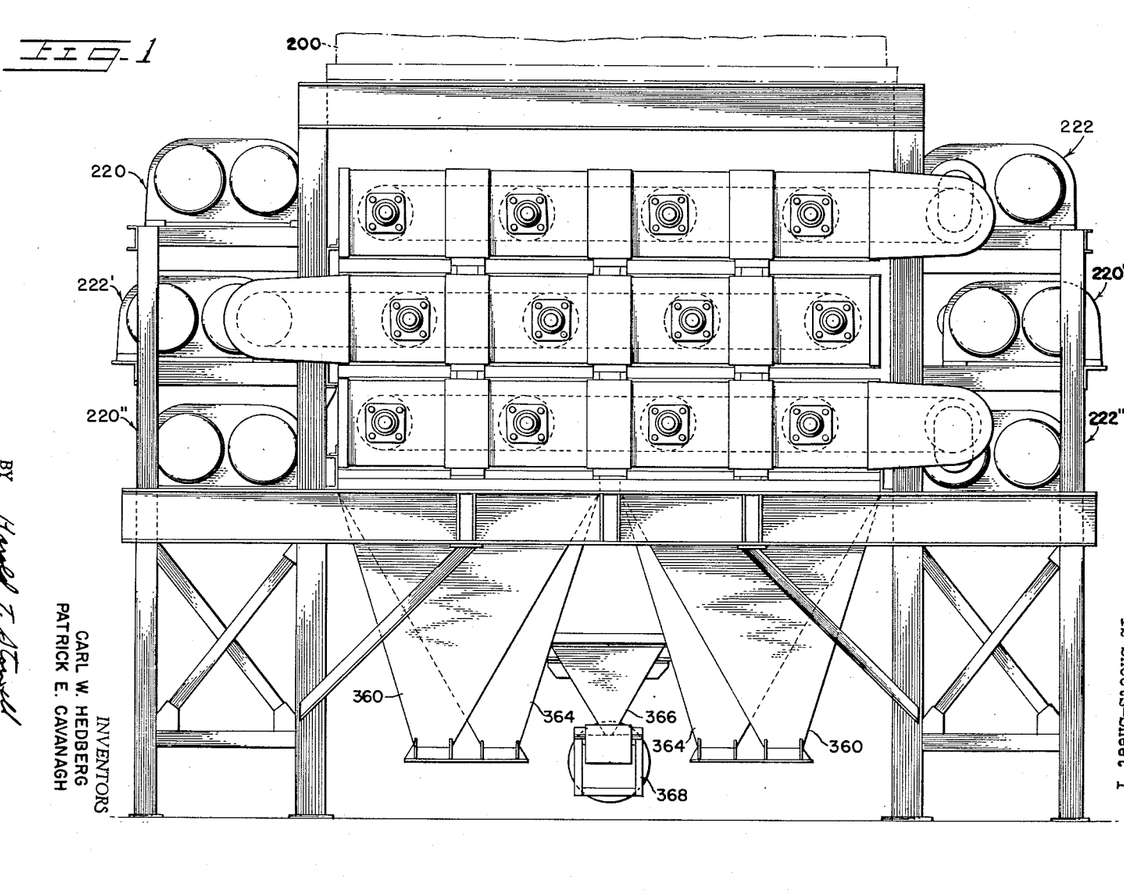
FIG. 1 is a vertical view of the magnetic separation apparatus adapted for treating the fine fraction of ground material.

Each of the magnetic separators 212 through 218 in each layer 210, 210' and 210" are identical, in form and operation, in each of the substantially vertical rows. It will also be apparent that separators 212 of layers 210, 210' and 210" may be considered as a unit as material treated in the uppermost unit is serially treated by the units 212 of the next lower rows 210' and 210". It will also be seen from FIGS. 1 and 3 that each parallel layer 210, 210' and 210" of separators is provided with a complete drive unit designated 220, 220', 220", 222, 222' and 222" respectively.

Referring particularly to FIGS. 7, 8, 9, 10 and 11, a single magnetic separator will now be described. These separators comprise an outer cylindrical drum having a substantially cylindrical deck 224 and heads 226 and 227. The deck 224 is preferably constructed of stainless steel and the drum heads 226 and 227 are preferably constructed of aluminum with plastic inserts 229 to prevent establishment of eddy currents. Drum head 226 is rotatably mounted on shaft 228 by anti-friction bearings 230. The other head 227 is also rotatably mounted on shaft 228' by anti-friction bearing 232. Drum head 227 also includes an extension portion 234 which has secured thereto a pair of cog wheels or sprockets 236.

Figure 7:
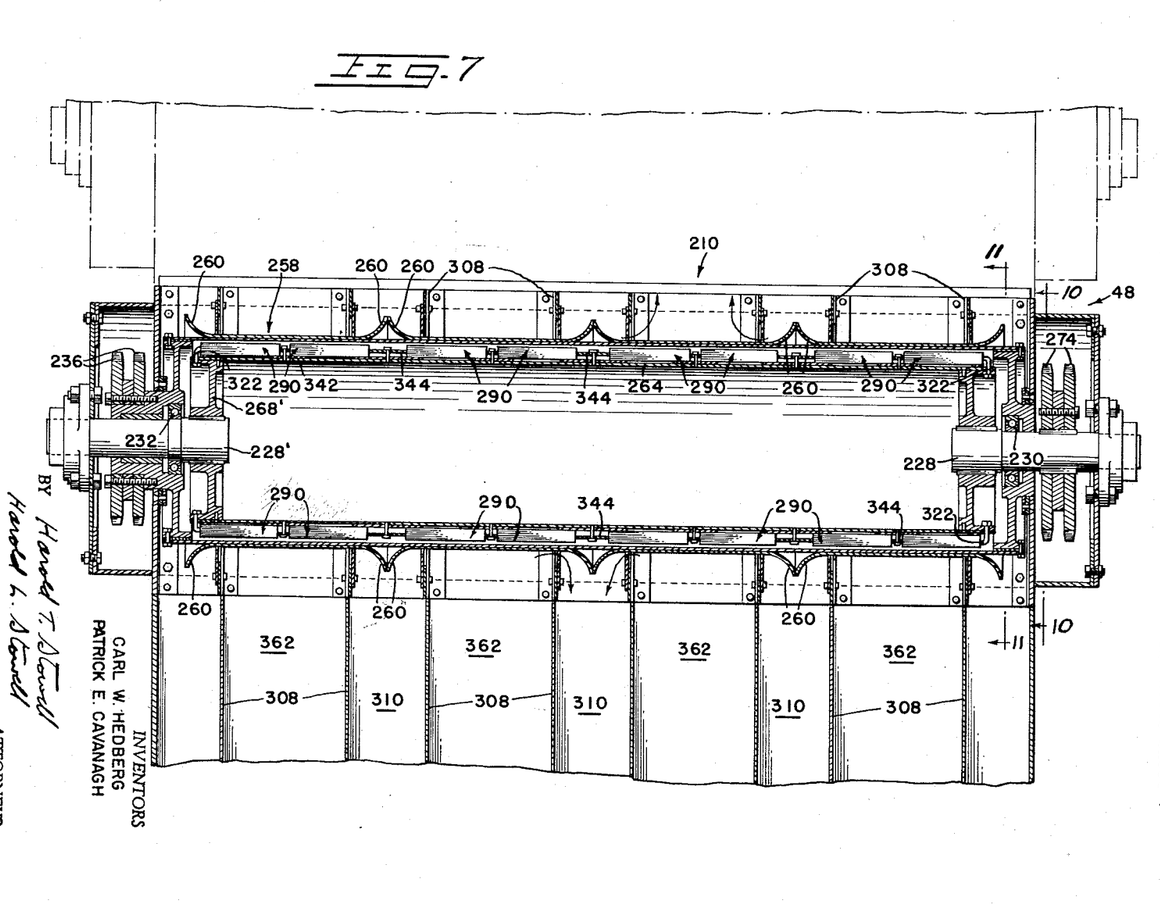
FIG. 7 is a section substantially on line 7—7 of FIG. 3.
Figure 8:
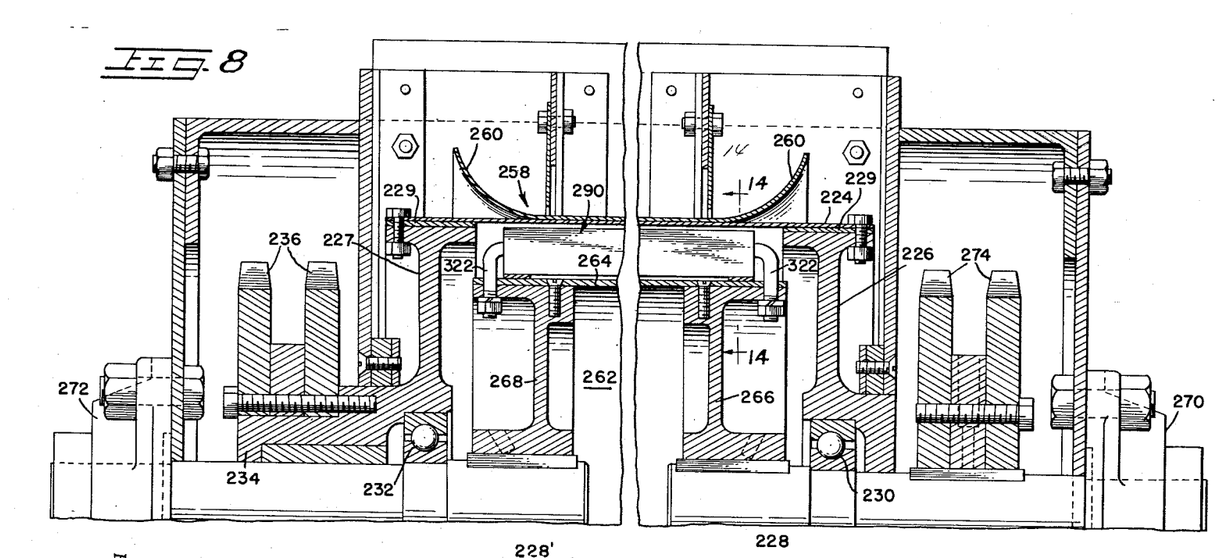
FIG. 8 is an enlarged fragmentary view of the structure shown in FIG. 7.

The cog wheels 236 of each layer 210 to 210' and 210" are driven by drive units 220, 220' and 220".

Each drive unit 220, etc. comprises an electric motor 238 connected to a conventional adjustable speed reducing mechanism 240 having an output shaft 242 to which is secured a cog wheel 244 which drives the plural sprockets 236 of each drum 224 through endless chains 246 maintained within drive chain housings 248 as more clearly shown in FIG. 2 of the drawings.

The outer surface of each drum deck 224 is divided into 4 sections designated 250, 252, 254 and 256 by cylindrical sleeves 258 which may have upturned peripheral ends 260. The peripheral edges of adjoining cylindrical baffles are in abutting relationship.

Within each of the drums 224 is rotatably mounted an inner drum generally designated 262, each drum 262 comprising a cylindrical shell 264 and drum heads 266 and 268. Drum head 266 is keyed to rotate with shaft 228 while drum head 268 is keyed to rotate with shaft 228'. The outer ends of shafts 228 and 228' are rotatably secured in bearings 270 and 272 at the respective ends of the separator units.

Between bearing 270 and 230 of shaft 228 are keyed a pair of cog wheels or sprockets 274, similar to sprockets 236 which drive the outer drum 224. Sprockets 274 are driven by drive units 222, 222' and 222" in each of the plural layers through motors 276, variable speed reduction means 278 having output shaft 280 which has keyed, to the extended end thereof, a sprocket 282 for driving endless chains 284 maintained within housing 286 enclosing the plural sprockets 274 in each of the plural layers of separator units.

Each of the inner drums 264 of the separators 48 has secured thereabout a plurality of permanent magnets 290. The form of the magnets 290, the attaching means therefor and their arrangement on the drum deck will be more particularly described with reference to FIGS. 7, 8, 9 and 14 through 21.

Figure 9:
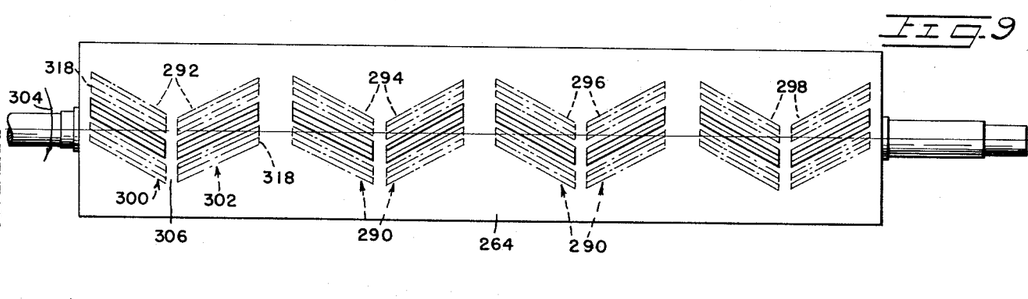
FIG. 9 is a top plan view of one of the rotor members of one of the magnetic separator shown in FIG. 1.
Figure 10:
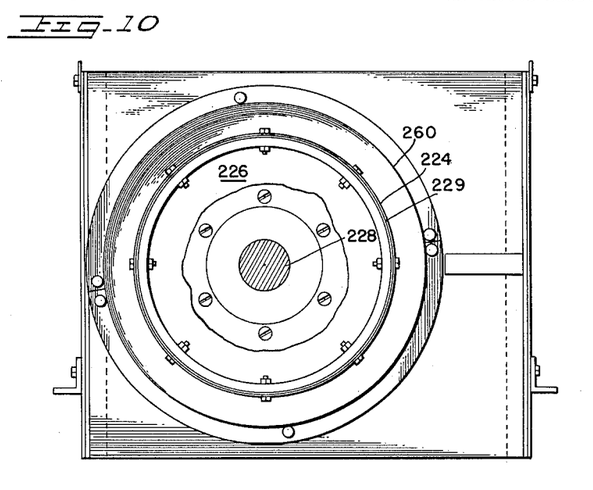
FIG. 10 is an end view of one of the magnetic separators on line 10—10 of FIG. 7.
Figure 11:
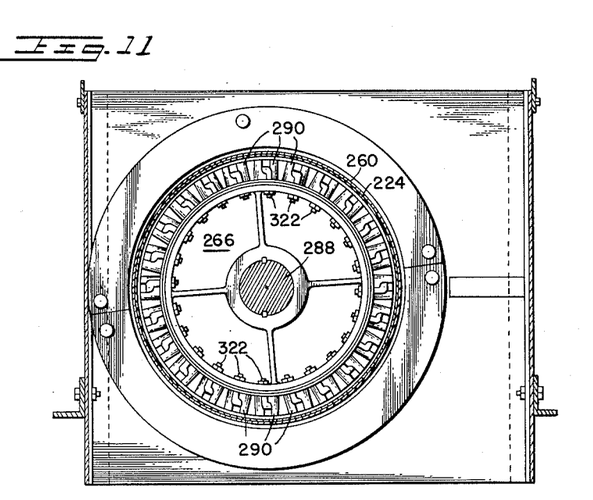
FIG. 11 is a similar view of one of the separators substantially on line 11—11 of FIG. 7.

Each inner drum 264 comprising one layer and designated 250, 252, 254 and 256 has arranged on the outer surface thereof four groups of magnets 290 designated 292, 294, 296 and 298. Each of these groups is identical in form and arrangement and the detailed description of arrangement 292 will also apply to the remainder of the group. Magnetic group 292 comprises two sets of plural magnets 300 and 302. The plural magnets in set 300 are positioned upon the outer surface of drum deck 264 in a generally spiral arrangement and the plural magnets in set 302 are positioned upon the drum deck in a reverse spiral arrangement so that the magnets of sets 300 and 302 cooperate to define a generally herring-bone configuration as best shown in FIG. 9 of the drawings. With the drum 264 rotating in the direction of directional arrow 304 of FIG. 9, the helically arranged magnets in sets 300 and 302 urge magnetic susceptible particles deposited on the outer surface of baffle 258 secured to the outer drum deck 224 to move toward the flared ends 260, in a direction away from the center line 306 of the collecting group 292. As more clearly shown in FIGS. 7 and 9, as the magnetic susceptible particles migrate toward the extended ends of the upturned baffles 260 the particles are progressively moved further from the magnetic field created by the plural magnets 290 and into collection zones formed by plural vertically extending baffles 308 from which the magnetic susceptible particles are discharged to collect in hoppers beneath the units 48 as to be more fully described hereinafter.

Adjacent baffles 308 form collection troughs 310 which intersect the drum adjacent the space between successive separation zones 292, 294, 296 and 298.

In order to provide the generally helical or herringbone configuration of the magnetic field in each of the collecting units the magnets 290 are preferably of U-shaped configuration in cross-section having extended pole faces 312 and 314. The elongated U-shaped magnets 290 are also curved or warped to conform to the outer surface of the inner drum 264 at their lower face 316 as more clearly shown in FIGS. 19 and 20 while the upper surface comprising pole faces 312 and 314 are shaped to conform generally to the shape of the inner surface of the outer drum deck 224 when the magnets are secured to the inner drum deck 264 in a generally helical array. Since each of the magnets 290 is a segment of a helix upon the drum deck 264 the ends 318 and 320 of the magnets are cut at an angle to the longitudinal axis of the magnet whereby each end face 218 and 220 is parallel to a radial plan through the drums.

The outermost units of magnets adjacent the drum heads 266 and 268 are secured to the drum deck 264 by bolts 322 having threaded ends 324 which pass through a band of non-magnetic material such as aluminum 326, the drum deck 264, and a portion of the drum heads 266 or 268 as the case may be. A nut and lock washer 328 secures the threaded ends of the bolts 322 to complete the assembly. The remote ends of each of the bolts 322 are bent at generally right angles to the longitudinal axis of the bolts as at 330 which curved end is adapted to fit into the space 332 between the legs of the U-shaped magnets as more clearly shown in FIGS. 15 and 16 of the drawings. In order to prevent interference with the magnetic field the bolts 322 are preferably constructed of non-magnetic material. The opposed ends of the magnets 290 of each unit 300 and 302 are connected together by means of a generally H-shaped clamping bar 334 with the legs 336 of the bars 334 extending into the spaces between the pole faces 312 and 314 of opposed pairs of magnets. A clamping screw 338 threadedly engages a tapped bore 340 in the drum deck whereby one clamping bracket 334 and one bolt 338 maintains the opposed ends of 4 U-shaped magnets 290 to the deck 264. A non-magnetic band 342 extends beneath the ends of the magnets and the clamping brackets 334 to eliminate eddy currents in the assembly. The opposed ends of the magnets of each separation set 250, 252, 254 and 256 for each drum 264 are clamped by a bracket 344 of FIG. 7 similar to brackets 334 only the width of the bar portions 346 of the brackets 344 are wider than the corresponding bar portions of brackets 334 to accommodate for the larger spacing between the magnets comprising the plural separating sections.

While the magnets 290 for the magnetic separators 48 have been described as having a generally U-shaped configuration in cross-section it will be apparent that elongated bars, rods or discrete magnetic blocks may be substituted therefor without departing from the scope of the present invention. In the preferred form of the present invention U-shaped magnets have been shown and described as the use of U-shaped magnets simplifies the attaching of the magnets to the outer surface of the inner drums 264.

The flow path of particles through separators 48 and the collection of magnetic and non-magnetic particles therein will be described with reference to FIGS. 1, 2, 3, 5, 6 and 7.

The fine particles of material suspended in the air stream entering the cylone type separating units through conduit 46 pass out the lower ends 198 of each of the separators along with about 5–10% of the suspending air stream. The particles and about 10% of the suspending air stream enter the plenum chamber 200 below the mechanical separator units where the air stream and the particles are divided into a plurality of smaller streams by baffles 208 and 206 more clearly shown in FIG. 6 of the drawings. From baffles 208 and 206 the air stream and the suspended particles flow past the upper tier of rotating drums 212, 214, 216 and 218. The outer surface of the magnetic separators are rotated in the direction of the directional arrows shown, for example, in FIG. 3. In passing the surfaces of the outer drums 224, the magnetic susceptible particles are held against the sleeve 258 and due to the helical form of the magnetic fields created by the helically arranged magnets 290, secured to the outer surface of the inner drum 264, the magnetic susceptible particles are urged to move towards flared ends 260 of said sleeves. In passing across the surface 258 of the sleeves to the flared ends 260 the magnetic particles pass under partition members 308 which form passages 310 for the magnetic susceptible particles. Once the particles are within the spaces 310 formed by the baffles 308 the particles are out of the major flow of gas through the separator and are caused to move away from the magnetic fields created by magnets 290 by the slope of the baffles as at 260. As the particles move further away from the magnetic fields they fall into the plural hoppers 360 positioned below the lowermost tier of drum type separators. The particles of magnetic susceptible material collect in hoppers 360 for further treatment or disposal.

As the magnetic susceptible particles pass the sleeves 258 an opposing current of air aids in maintaining a clean separation between the magnetic and non-magnetic particles. The opposing stream of air is conveyed into each tier of rotating drums through a header 217, 217' and 217" providing a plurality of off-take pipes 219 which directs the air into the plural passages 221 between each vertical tier of separators. The air forced into passages 221 flows into the concentrate conduits 310 through openings 223, all as more clearly shown in FIG. 2 and FIG. 6 of the drawings.

The non-magnetic materials and those having very weak magnetic attractabilities pass over the surface of the drum and are deposited upon the drums of the next lower tier where further concentration takes place. The magnetic susceptible materials removed from the air stream again enter confined passageways 310 and the non-magnetic materials are carried by the air stream to the next lower rotating drums. The non-magnetic materials leaving the lowermost tier of drums pass into the spaces 362 interposed between the concentrate conveying passages 310. In passing through the spaces 362 to the lower end of the non-magnetic material receiving hoppers 364 the carrier gas stream is withdrawn through an air draw-off system generally designated 366.

Figure 3:
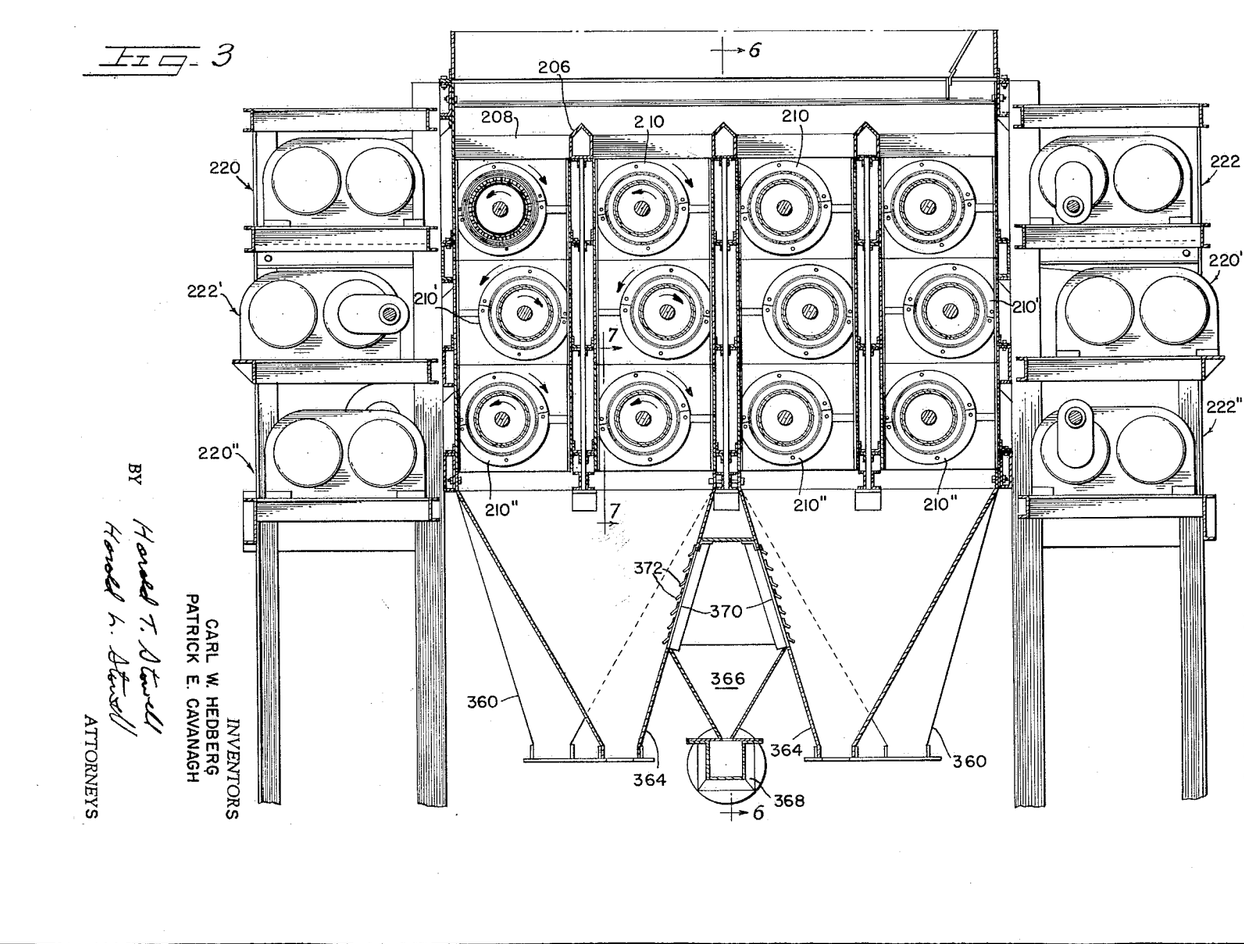
FIG. 3 is a section substantially on line 3—3 of FIG. 2.
Figure 6:
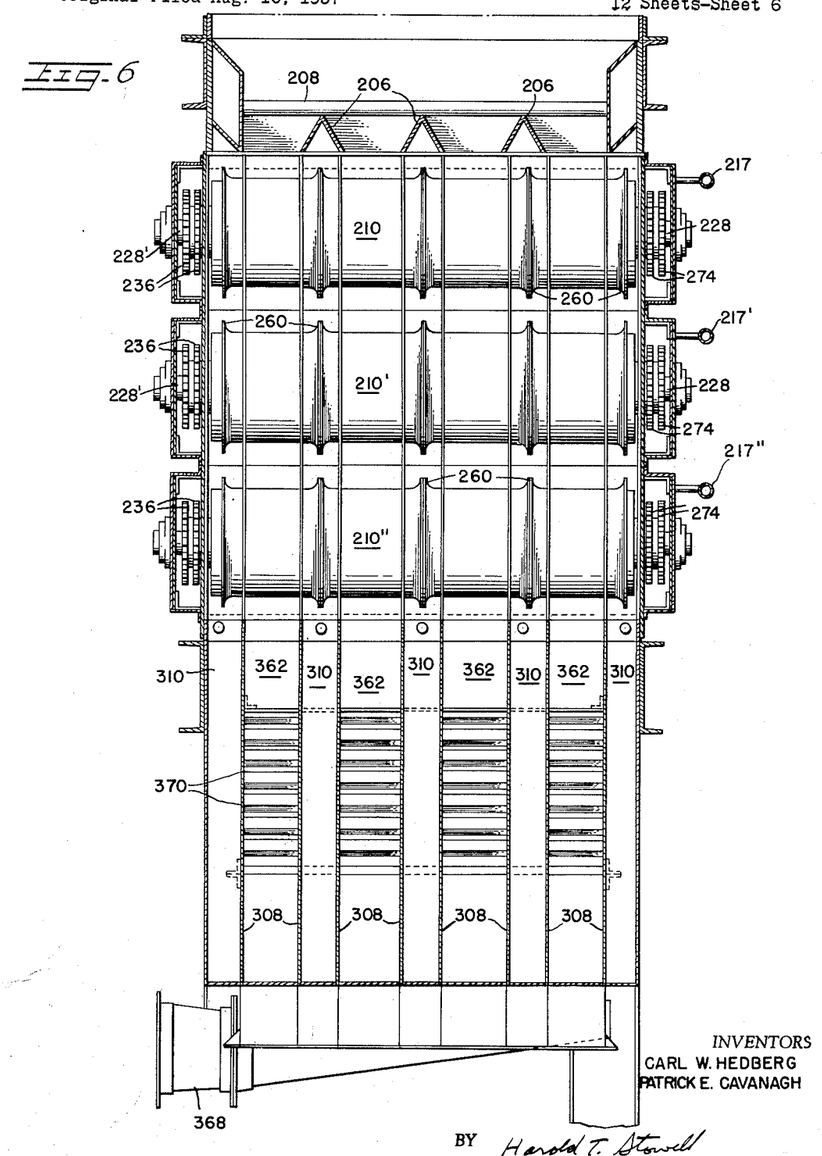
FIG. 6 is a section substantially on line 6—6 of FIG. 3.

The air stream draw-off system generally comprises an off-take pipe 368 more clearly shown in FIGS. 3 and 6 connected to a source of reduced pressure created, for example, by a fan. Gas drawn through the conduits 368 creates a zone of lower pressure in chamber 366 whereby the air stream containing the non-magnetic particles within the passages 362 is caused to pass through louver sections 370 which communicate with a portion of the passages 362 as shown in FIG. 6. The louvered passages 370 are constructed of a plurality of overlapped louvers or turning vanes 372 which are so positioned that the air stream in passing between the plural louvers is caused to turn sharply. In turning past the edges of the louvers 372, the particles of non-magnetic material suspended in the air stream are thrown outwardly and downwardly into the lower end of the hoppers 364 from which they pass through suitable conduits.

From the conduits the substantially non-magnetic materials may be disposed of or directed to further magnetic separators.

The air stream withdrawn from plenum chamber 366 through conduit 368 may be passed through a conventional gas cleaning system.

It has been found that very satisfactory separation is brought about in separators 48 when the diameter of the outermost drums 224 is from about 8 to about 18 inches and the innermost drum rotates in the opposite direction in close proximity to the inner surface thereof. It will be appreciated that the speed of the drums and their diameters and the strength of the magnetic fields created by the plural magnets 290 are all interdependent so that if the speed of rotation of the drums is increased or the diameter of the drums are decreased the field strength of the magnets must be increased.

With the separator units wherein the outer drum is from about 8 to about 18 inches in diameter satisfactory results are obtained when the outer drum is rotated at from about 25 to about 200 r.p.m., the inner drum is rotated in the opposite direction at from about 50 to about 400 r.p.m., and the magnetic field created by the magnets is from about 700 to about 1000 gauss at the surface of the outer drum 224.

With this arrangement of magnetic field strength, drum diameters and speeds of rotation satisfactory operation and separation of particles in the range of from about −150 to about +325 mesh containing from about 10 to 40% of −325 mesh particles.

From the foregoing description, it will be seen that the present invention provides a new and useful means for concentrating low grade magnetic susceptible iron ores that fully accomplishes the aims and objects hereinbefore set forth.

This application is a division of our co-pending application Serial No. 678,468 filed August 16, 1957, now United States Patent 2,990,124 issued June 27, 1961.

We claim:

1. A magnetic separator for air suspended particles comprising a first cylindrical drum, means axially mounting said drum for rotation in a generally horizontal plane, means for rotating said drum about the axial mounting, a second cylindrical drum having a diameter less than the diameter of the said first drum, a plurality of permanent magnets secured to the outer surface of said second cylindrical drum in adjacent right and left hand arrays of helical segments, means for mounting said second cylindrical drum for rotation within said first cylindrical drum, means for rotating said second cylindrical drum to provide a differential speed between the first and second drums, means for directing air suspended particulate material including magnetic susceptible particles to the outer surface of said first cylindrical drum, means for collecting magnetic susceptible particles adjacent the edges of said first cylindrical drum where the attractive force of the magnetic field is reduced, and means adjacent said collection zone for directing a stream of pressure fluid in a direction opposite to the direction of travel of the magnetic susceptible particles.

2. A magnetic separator for air suspended particles comprising a first cylindrical drum having outwardly flared peripheral edges, means axially mounting said drum for rotation in a generally horizontal plane, means for rotating said drum about the axial mounting, a second cylindrical drum having a diameter less than the diameter of said first drum, a plurality of substantially U-shaped permanent magnets secured to the outer surface of said second cylindrical drum in adjacent right and left hand arrays of helical segments with the legs of said U-shaped magnets directed toward the inner cylindrical surface of said first drum, means for mounting said second cylindrical drum for rotation within said first cylindrical drum, means for rotating said second cylindrical drum to provide a differential speed between the first and second drums, means for directing air suspended particulate material including magnetic susceptible particles to the outer surface of said first cylindrical drum, means for collecting magnetic susceptible particles adjacent the flared edges of said first cylindrical drum where the attractive force of the magnetic field is reduced, and means adjacent said collection zone for directing a stream of air in a direction opposite to the direction of travel of the magnetic susceptible particles.

3. The invention defined in claim 2 wherein said U-shaped magnets create a magnetic field of from about 700 to about 1000 gauss.

4. A permanent magnet for a magnetic drum separator comprising an elongated magnet having a generally U-shaped configuration in cross-section, said U-shaped magnet being warped into a segment of a helix defined on the outer surface of a magnetic drum.

5. The invention defined in claim 2 wherein the means for directing air suspended particulate material to the outer surface of said first cylindrical drum includes a plurality of cyclone type gas suspended particle separating means, each of said particle separating means having a gas suspended particle inlet, an outlet for a portion of the particle suspending gas, and a concentrated particle and gas outlet, each of said concentrated particle and gas outlets positioned to discharge generally vertically above the upper surface of said first cylindrical drum, whereby the particulate material suspended in a portion of a gas stream directed to the cyclone type gas suspended particle separating means is directed toward the upper surface of said first cylindrical drum.

6. The invention defined in claim 5 including means for removing the remainder of the particle suspending gas below said magnetic separator.

References Cited in the file of this patent

UNITED STATES PATENTS

| 528,055 | Williams | Oct. 23, 1894 |
| 2,144,184 | Hale et al. | Jan. 17, 1939 |
| 2,711,249 | Laurila | June 21, 1955 |

FOREIGN PATENTS

| 401,301 | Great Britain | Apr. 4, 1932 |
| 376,458 | Italy | Nov. 15, 1939 |
| 968,015 | France | Nov. 4, 1953 |